United States Patent
Okamoto et al.

(10) Patent No.: US 12,065,517 B2
(45) Date of Patent: Aug. 20, 2024

(54) PRODUCTION METHOD OF POLYVINYL ALCOHOL RESIN, AND POLYVINYL ALCOHOL RESIN

(71) Applicant: KURARAY CO., LTD., Kurashiki (JP)

(72) Inventors: Yuji Okamoto, Okayama (JP); Yoshimi Umemura, Singapore (SG)

(73) Assignee: KURARAY CO., LTD., Kurashiki (JP)

( * ) Notice: Subject to any disclaimer, the term of this patent is extended or adjusted under 35 U.S.C. 154(b) by 672 days.

(21) Appl. No.: 17/267,267

(22) PCT Filed: Sep. 3, 2019

(86) PCT No.: PCT/JP2019/034580
§ 371 (c)(1),
(2) Date: Feb. 9, 2021

(87) PCT Pub. No.: WO2020/050255
PCT Pub. Date: Mar. 12, 2020

(65) Prior Publication Data
US 2021/0309770 A1   Oct. 7, 2021

(30) Foreign Application Priority Data
Sep. 5, 2018   (JP) .................................. 2018-165896

(51) Int. Cl.
*C08F 16/06* (2006.01)
*C08F 6/28* (2006.01)
*C08F 6/26* (2006.01)
*C08F 18/08* (2006.01)

(52) U.S. Cl.
CPC ................ *C08F 16/06* (2013.01); *C08F 6/26* (2013.01); *C08F 6/28* (2013.01); *C08F 18/08* (2013.01)

(58) Field of Classification Search
CPC .. C08F 16/06; C08F 6/008; C08F 6/26; C08F 6/28; C08F 18/08
See application file for complete search history.

(56) References Cited

U.S. PATENT DOCUMENTS

| | | | |
|---|---|---|---|
| 2,759,914 A * | 8/1956 | Kenyon | C08F 8/12 528/480 |
| 3,278,505 A * | 10/1966 | Tsuguo | C08F 8/12 525/62 |
| 5,221,589 A | 6/1993 | Nanba et al. | |
| 6,080,814 A * | 6/2000 | Charrin | C08F 6/001 528/480 |
| 9,074,031 B2 * | 7/2015 | Watanabe | C08F 216/06 |
| 10,016,959 B2 | 7/2018 | Kusudou et al. | |
| 10,988,606 B2 * | 4/2021 | Nii | C08K 5/0016 |
| 2012/0329949 A1 | 12/2012 | Watanabe et al. | |
| 2016/0215076 A1 * | 7/2016 | Lu | C08F 216/06 |
| 2016/0271911 A1 | 9/2016 | Kusudou et al. | |
| 2017/0043557 A1 | 2/2017 | Kobayashi et al. | |
| 2021/0009842 A1 * | 1/2021 | Morikawa | C08F 218/08 |

FOREIGN PATENT DOCUMENTS

| | | | | |
|---|---|---|---|---|
| CN | 1187826 A | 7/1998 | | |
| CN | 105848894 A | 8/2016 | | |
| CN | 106008762 A | 10/2016 | | |
| EP | 3 109 213 A1 | 12/2016 | | |
| EP | 3 778 807 A1 | 2/2021 | | |
| JP | 4-218050 A | 8/1992 | | |
| JP | 9-302024 A | 11/1997 | | |
| JP | 11-504374 A | 4/1999 | | |
| JP | 2000-351853 A * | 12/2000 | | C08J 3/28 |
| JP | 2001-81128 A * | 3/2001 | | C08F 8/12 |
| JP | 2007-245432 A * | 9/2007 | | B29B 15/06 |
| JP | 2011-178964 A | 9/2011 | | |
| JP | 2013-28712 A | 2/2013 | | |
| JP | 5705056 B2 * | 3/2015 | | C08F 6/00 |
| JP | 2016-138232 A | 8/2016 | | |
| WO | WO 2011/108152 A1 | 9/2011 | | |
| WO | WO 2018/061272 A1 | 4/2018 | | |
| WO | WO 2022/209594 A1 * | 10/2022 | | C08F 8/12 |

OTHER PUBLICATIONS

JP 2007-245532 A (Sep. 27, 2007); machine translation. (Year: 2007).*
Extended European Search Report issued May 2, 2022 in European Patent Application No. 19856547.5, 7 pages.
International Search Report issued on Nov. 19, 2019 in PCT/JP2019/034580 filed on Sep. 3, 2019, 2 pages.

* cited by examiner

*Primary Examiner* — Rip A Lee
(74) *Attorney, Agent, or Firm* — Oblon, McClelland, Maier & Neustadt, L.L.P.

(57) ABSTRACT

Provided by the present invention is a production method of a polyvinyl alcohol resin in which a content of organic volatiles has been reduced while inhibiting fusing of the resin to itself. The production method includes a step of washing, with a washing liquid, a polyvinyl alcohol obtained by saponifying a polyvinyl ester, wherein the washing liquid contains 50 to 98 parts by mass of methyl acetate, 1 to 49 parts by mass of methanol, and 1 to 10 parts by mass of water with respect to 100 parts by mass being a total of methyl acetate, methanol, and water.

20 Claims, No Drawings

PRODUCTION METHOD OF POLYVINYL ALCOHOL RESIN, AND POLYVINYL ALCOHOL RESIN

CROSS-REFERENCE TO RELATED APPLICATIONS

The present application is the national stage of international application PCT/JP2019/034580, filed on Sep. 3, 2019, and claims the benefit of the filing date of Japanese Appl. No. 2018-165896, filed on Sep. 5, 2018.

TECHNICAL FIELD

The present invention relates to a production method of a polyvinyl alcohol resin, and a polyvinyl alcohol resin.

DISCUSSION OF THE BACKGROUND

Polyvinyl alcohol resins are water-soluble polymers having a hydroxyl group, and were originally used mainly as a raw material for synthetic fiber vinylon. In recent years, polyvinyl alcohol resins have also been used in emulsions, emulsification dispersants, paper, film materials, and thickening agents.

Polyvinyl alcohol resins can be produced by, for example, polymerizing a vinyl ester to give a polyvinyl ester, and then saponifying the polyvinyl ester. However, even after drying, organic volatiles such as methanol and methyl acetate, being used as a solvent or generated as impurities, are contained in the polyvinyl alcohol resin in an amount of approximately a few percent. To reduce such organic volatiles, various efforts such as humidity-controlled drying, washing, and the like have been made (see Patent Documents 1 and 2).

PRIOR ART DOCUMENTS

Patent Documents

Patent Document 1: Japanese Unexamined Patent Application, Publication No. H9-302024
Patent Document 2: Japanese Unexamined Patent Application, Publication No. 2011-178964

SUMMARY OF THE INVENTION

Problems to be Solved by the Invention

For example, in a humidity-controlled drying technique for a polyvinyl alcohol resin disclosed in Patent Document 1, there are cases in which an effect of reducing the organic volatiles is insufficient due to steam reaching only a surface portion of the polyvinyl alcohol resin. Furthermore, in the method disclosed by Patent Document 1, there are cases in which an amount of steam blown increases, resulting in blocking of the resin due to fusing to itself.

Moreover, in washing with a washing liquid disclosed in Patent Document 2, due to a high content of methanol, the polyvinyl alcohol resin is prone to fusing when a moisture content of the washing liquid is increased; thus, there are cases in which the polyvinyl alcohol resin adhering to a dryer is observed, cases in which aggregates of the polyvinyl alcohol resin are generated, and the like.

The present invention was made in view of the foregoing circumstances, and an object of the invention is to provide: a production method of a polyvinyl alcohol resin which enables easily reducing a content of organic volatiles while inhibiting fusing of resin to itself; and a polyvinyl alcohol resin obtained by the production method.

Means for Solving the Problems

The aforementioned problems are solved by providing a production method of a polyvinyl alcohol resin, the production method including washing with a washing liquid containing methyl acetate, methanol, and water, each in a specific amount.

More specifically, the present invention includes the following:

(1) A production method of a polyvinyl alcohol resin, the production method including washing, with a washing liquid, a polyvinyl alcohol obtained by saponifying a polyvinyl ester, wherein the washing liquid contains 50 to 98 parts by mass of methyl acetate, 1 to 49 parts by mass of methanol, and 1 to 10 parts by mass of water with respect to 100 parts by mass being a total of methyl acetate, methanol, and water;

(2) The production method according to (1), wherein in the washing, counter-current washing is conducted at a temperature of 40 to 60 °C and a flow rate of 0.1 to 1 mm/s; and (3) A polyvinyl alcohol resin obtained by the production method according to (1) or (2), wherein a content of methanol is less than 1.00% by mass, and a content of methyl acetate is less than 2.00% by mass.

Effects of the Invention

According to the production method of the present invention, the polyvinyl alcohol resin in which the content of organic volatiles has been reduced while inhibiting fusing of the resin to itself can be easily obtained. Furthermore, due to the content of each of methanol and methyl acetate being low, the polyvinyl alcohol resin obtained by the production method of the present invention can be suitably used for usages pertaining to foods, cosmetics, and medical drugs, for which a reduction in organic volatiles is particularly desired.

DESCRIPTION OF EMBODIMENTS

The present invention relates to a production method of a polyvinyl alcohol resin (hereinafter, may be also referred to as "PVA resin"), the production method including washing, with a washing liquid, a polyvinyl alcohol obtained by saponifying a polyvinyl ester, wherein the washing liquid contains 50 to 98 parts by mass of methyl acetate, 1 to 49 parts by mass of methanol, and 1 to 10 parts by mass of water with respect to 100 parts by mass being a total of methyl acetate, methanol, and water.

In production of a PVA resin, as described later, a production method including a polymerizing step using a vinyl ester as a raw material, a saponifying step, a washing step, and a drying step can be suitably applied. However, commonly, methanol and methyl acetate, used as a solvent at a time of production, remain in the PVA resin even after the drying step. The content of the organic volatiles such as methanol and methyl acetate in the PVA resin can be adjusted by, for example, modifying washing conditions and/or drying conditions. However, since the organic volatiles being incorporated into a resin are difficult to volatize, it is difficult to sufficiently reduce the organic volatiles in the case of using a conventional production method. Although not necessarily clarified, the reason for enabling reduction of the organic volatiles in the PVA resin due to including the step in which the washing is conducted using a washing liquid containing each of methyl acetate, methanol, and water in specific amounts, as in the production method of the present invention, is inferred to be as in the following: water molecules are incorporated further into the polyvinyl alcohol and plasticized, and as a result, the organic volatiles such as methanol and methyl acetate can be easily reduced at a time of drying.

Production Method of PVA Resin

The production method of the PVA resin according to one embodiment of the present invention includes the washing step of washing, with the washing liquid, the polyvinyl alcohol obtained by saponifying the polyvinyl ester, wherein the washing liquid contains 50 to 98 parts by mass of methyl acetate, 1 to 49 parts by mass of methanol, and 1 to 10 parts by mass of water with respect to 100 parts by mass being a total of methyl acetate, methanol, and water. The production method of the one embodiment of the present invention suitably includes: a polymerizing step in which the polyvinyl ester is obtained by polymerizing a vinyl ester; a saponifying step in which the polyvinyl ester is saponified; the washing step; and a drying step.

Polymerizing Step

The polyvinyl ester can be produced by polymerizing the vinyl ester by a conventionally well-known method such as a bulk polymerization method, a solution polymerization method, a suspension polymerization method, an emulsion polymerization method, a dispersion polymerization method, and the like. The solution polymerization method in which the polymerization is conducted using a lower alcohol as a solvent is preferred. The lower alcohol is not particularly limited, and is preferably an alcohol having 3 or fewer carbon atoms, such as methanol, ethanol, propanol, or isopropanol; and is more preferably methanol. For a polymerization operation, it is possible to employ a polymerization system selected from any of a batch system, a semi-batch system, and a continuous system.

In polymerization, copolymerization may be conducted with other monomer(s) aside from the vinyl ester within a range not impairing the principles of the present invention. Examples of the other monomer include:
  α-olefins such as ethylene, propylene, n-butene, and isobutylene;
  (meth)acrylic acid and salts thereof;
  (meth)acrylic acid esters such as methyl (meth)acrylate, ethyl (meth)acrylate, n-propyl (meth)acrylate, i-propyl (meth)acrylate, n-butyl (meth)acrylate, i-butyl (meth)acrylate, t-butyl (meth)acrylate, 2-ethylhexyl (meth)acrylate, dodecyl (meth)acrylate, and octadecyl (meth)acrylate;
  (meth)acrylamide compounds such as (meth)acrylamide, N-methyl(meth)acrylamide, N-ethyl(meth)acrylamide, N,N-dimethyl(meth)acrylamide, diacetone(meth)acrylamide, (meth)acrylamidepropanesulfonic acid and salts thereof, (meth)acrylamidepropyldimethylamine and salts thereof or quaternary salts thereof, and N-methylol(meth)acrylamide and derivatives thereof;
  vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, and stearyl vinyl ether;
  nitriles such as acrylonitrile and methacrylonitrile;
  vinyl halides such as vinyl chloride and vinyl fluoride;
  vinylidene halides such as vinylidene chloride and vinylidene fluoride;
  allyl compounds such as allyl acetate and allyl chloride;
  unsaturated dicarboxylic acids such as maleic acid, itaconic acid, and fumaric acid, and salts or esters thereof;
  vinyl silyl compounds such as vinyltrimethoxysilane; and
  isopropenyl acetate.

These may be used alone, or in a combination of two or more types thereof. The other monomer(s) is/are typically copolymerized in an amount of 10 mol % or less. It is to be noted that as referred to herein, (meth)acryl includes both of methacryl and acryl.

A polymerization temperature is not particularly limited, and is preferably 0 to 180° C., more preferably 20 to 160° C., and still more preferably 30 to 150° C. When the polymerization is conducted at or below a boiling point of the solvent used in the polymerizing step, either of: boiling polymerization under reduced pressure, in which the polymerization is conducted while permitting the solvent to boil under reduced pressure; and non-boiling polymerization under normal pressure, in which the polymerization is conducted under conditions at which the solvent is not permitted to boil under normal pressure, may be selected. Further, when the polymerization is conducted at or above the boiling point of the solvent used in the polymerizing step, either of: non-boiling polymerization under pressure, in which the polymerization is conducted under conditions at which the solvent is not permitted to boil under pressure; or boiling polymerization under pressure, in which the polymerization is conducted while permitting the solvent to boil under pressure, may be selected.

Saponifying Step

In the saponifying step, an alcoholysis reaction or a hydrolysis reaction, each being in the presence of a saponification catalyst, can be applied to a solution containing the polyvinyl ester obtained in the polymerizing step. The saponification catalyst is exemplified by an alkali catalyst and an acidic catalyst, and of these, an alkali metal, and especially a catalyst having a sodium atom, is particularly preferred. Examples of the catalyst having a sodium atom include sodium hydroxide, sodium methoxide, and the like. In terms of a molar ratio with respect to vinyl ester units in the polyvinyl ester, a usage amount of the saponification catalyst is preferably 0.001 or more and 0.5 or less, more preferably 0.002 or more and 0.4 or less, and still more preferably 0.004 or more and 0.3 or less. As a solvent used in the saponifying step, a solvent containing methanol is preferred. It is to be noted that alcohols such as ethanol; esters such as methyl acetate and ethyl acetate; ketones such as acetone and methyl ethyl ketone; and/or aromatic hydrocarbons such as benzene and toluene may be contained, and an amount thereof is typically less than 10% by mass with respect to methanol in the saponification system.

Washing Step

It is important that the production method of the one embodiment of the present invention includes the washing step of washing, with the washing liquid, the polyvinyl alcohol obtained by saponifying the polyvinyl ester, wherein the washing liquid contains 50 to 98 parts by mass of methyl acetate, 1 to 49 parts by mass of methanol, and 1 to 10 parts by mass of water with respect to 100 parts by mass being a total of methyl acetate, methanol, and water. In light of, for example, still further reducing the organic volatiles in the PVA resin to be obtained, the content of methyl acetate in the washing liquid is preferably 56 to 90 parts by mass, more preferably 58 to 80 parts by mass, and may be still more preferably 60 to 70 parts by mass with respect to 100 parts by mass being a total of methyl acetate, methanol, and water. The content of methanol in the washing liquid is preferably 9 to 40 parts by mass, more preferably 18.5 to 40 parts by mass, and may be still more preferably 20 to 38 parts by mass with respect to 100 parts by mass being a total of methyl acetate, methanol, and water. The content of methanol may be preferably 30 to 40 parts by mass. The content of water in the washing liquid is preferably 1 to 5 parts by mass, more preferably 1.5 to 4 parts by mass, and may be still more preferably 1.5 to 3 parts by mass with respect to 100 parts by mass being a total of methyl acetate, methanol, and water. The content of water may be preferably 2 to 5 parts by mass. The present inventors have found that by adding a certain amount of water to the washing liquid, while the content of the organic volatiles in the PVA resin can be reduced, there is a problem in which the PVA resin fuses to itself. Accordingly, the present inventors have confirmed that using methyl acetate in an amount greater than the amount of methanol in the washing liquid therein enables more water to be contained in the washing liquid while controlling the fusing of the PVA resin to itself. It is inferred that when the washing liquid is used, water in the washing liquid is incorporated into the polyvinyl alcohol (plasticization by water), and that as a result, intramolecular interactions and intermolecular interactions of the polyvinyl alcohol are weakened, enabling methanol and methyl acetate to be easily reduced in the drying step, to be described later.

When the content of methyl acetate in the washing liquid is less than 50 parts by mass, the PVA resin is prone to fusing to itself; thus, the PVA resin adhering to a dryer is observed, and aggregates of the PVA resin may be generated. On the other hand, when the content of methyl acetate is more than 98 parts by mass, the plasticization by water may be insufficient. Moreover, when the content of methanol in the washing liquid is less than 1 part by mass, the plasticization by water may be insufficient. On the other hand, when the content of methanol is more than 50 parts by mass, the PVA resin is prone to fusing to itself; thus, the PVA resin adhering to a dryer is observed, and aggregates of the PVA resin may be generated. Furthermore, when the content of water in the washing liquid is less than 1 part by mass, the quantity of water incorporated into the polyvinyl alcohol is so low that the plasticization may be insufficient, and the content of the organic volatiles may not be sufficiently reduced. On the other hand, when the amount of water is more than 10 parts by mass, the PVA resin is prone to fusing to itself; thus, the PVA resin adhering to a dryer is observed, and aggregates of the PVA resin may be generated.

The washing liquid may be substantially constituted from methyl acetate, methanol, and water. A total amount of methyl acetate, methanol, and water in the washing liquid is preferably 90% by mass or more, more preferably 99% by mass or more, and may be 100% by mass.

A solid content concentration of the polyvinyl alcohol in the washing step is not particularly limited, and is preferably 1 to 30% by mass. In the washing step, a form of the polyvinyl alcohol is not particularly limited, and the polyvinyl alcohol may be in a slurry form or a powdery form. In the case of being in the powdery form, a powder having an average particle diameter of 50 to 2,000 μm is preferred. As referred to herein, the solid content concentration of the polyvinyl alcohol in the washing step means, typically, a proportion of the polyvinyl alcohol with respect to a mixed liquid which contains the polyvinyl alcohol having been washed, the washing liquid, and the like (for example, a mixed liquid containing the polyvinyl alcohol, the washing liquid, and the like in a washing tank).

A washing temperature is not particularly limited, and is typically a temperature from 20° ° C. to the boiling point of the solvent, and is preferably from 40 to 60° C. When the washing temperature is equal to or more than the lower limit, the quantity of water incorporated into the polyvinyl alcohol increases, thereby facilitating reduction of the organic volatiles. On the other hand, when the washing temperature is more than 60° C., methanol in the washing liquid begins to boil.

A washing procedure for the polyvinyl alcohol is not particularly limited, and may be exemplified by: a procedure of charging into the washing tank, the washing liquid and the polyvinyl alcohol obtained in the saponifying step, and stirring the mixture; a procedure of spraying the washing liquid onto the polyvinyl alcohol obtained in the saponifying step; and a procedure of bringing the polyvinyl alcohol obtained in the saponifying step and the washing liquid into contact with one another by counter-current.

Of the aforementioned procedures, the washing procedure for the polyvinyl alcohol is preferably counter-current washing, in which the washing liquid and the polyvinyl alcohol obtained in the saponifying step are brought into contact with one another by counter-current. Counter-current washing as referred to herein means a procedure involving, while feeding the polyvinyl alcohol obtained in the saponifying step into the washing tank, flowing the washing liquid thereinto from a direction opposite to that of the flowing direction of the polyvinyl alcohol in the washing tank, that is, from a direction which forms a so-called counter-current flow. Due to flowing the washing liquid from the counter-current direction, washing efficiency is improved in comparison to a case of flowing the washing liquid in the same direction as the flowing direction of the polyvinyl alcohol, that is, flowing such that the washing liquid flows in a co-current direction, or a case of flowing the washing liquid in a direction that intersects perpendicularly to the flow of the polyvinyl alcohol. The washing liquid may be flowed continuously or intermittently, and a supply site of the washing liquid is not particularly limited as long as a counter-current flow is formed with respect to the flow of the polyvinyl alcohol.

Specifically, in the washing step, the washing is preferably conducted by allowing a counter-current between the polyvinyl alcohol and the washing liquid at a flow rate of 0.1 to 1 mm/s. The flow rate as referred to herein means a speed at a time of movement of fluid, and can be determined from a flowing quantity of the washing liquid and an aperture of the washing tank. In a case of the flow rate being less than 0.1 mm/s, the washing efficiency tends to decrease, and in a case of the flow rate being more than 1 mm/s, the polyvinyl alcohol tends to float and overflow from the washing tank. In both of the case of the counter-current washing and a case of an other washing procedure, the flow rate of the washing liquid is considered to be the flow rate in the washing step. A time period of the washing is not particularly limited, and the washing is preferably conducted for 30 min to 10 hrs.

Drying Step

After the washing step, the drying step may be performed as needed. A temperature and a time period in the drying step are not particularly limited, and typically, the drying is conducted preferably at 40 to 130° C. for 1 to 20 hrs, and more preferably at 80 to 120° ° C. for 1.5 to 6 hrs. Conducting the drying under such conditions enables the PVA resin in which the content each of methanol and methyl acetate has been reduced to be easily obtained.

PVA Resin

The PVA resin obtained by the production method of the one embodiment of the present invention is a resin having the polyvinyl alcohol as a principal component. A content of the polyvinyl alcohol in the PVA resin is preferably 80% by mass or more, more preferably 90% by mass or more, and still more preferably 95% by mass or more. The content of the polyvinyl alcohol in the PVA resin may be 99.9% by mass or less, and may be 99% by mass or less. Components other than the polyvinyl alcohol which may be contained in the PVA resin may be exemplified by methanol, methyl acetate, water, and the like.

In the PVA resin obtained by the production method of the one embodiment of the present invention, preferably, a content of methanol is less than 1.00% by mass and a content of methyl acetate is less than 2.00% by mass. In the PVA resin, the content of methanol is preferably less than 0.95% by mass, and more preferably less than 0.90% by mass. Moreover, in the PVA resin, the content of methyl acetate is preferably less than 1.80% by mass, and more preferably less than 1.70% by mass. In the PVA resin, when the content of each of methanol and methyl acetate is within the above range, the PVA resin can be suitably used for usages pertaining to foods, cosmetics, and medical drugs, for which a reduction in organic volatiles is particularly desired. The content of each of methanol and methyl acetate in the PVA resin can be determined by using headspace gas chromatography as in the Examples, as described later. Furthermore, the content of methanol is preferably lower than the content of methyl acetate. In light of productivity and the like, the lower limit of the content of methanol in the PVA resin may be, for example, 0.1% by mass, and may be 0.3% by mass or 0.5% by mass. In light of productivity and the like, the lower limit of the content of methyl acetate in the PVA resin may be, for example, 0.1% by mass, and may be 0.3% by mass or 0.5% by mass.

A viscosity-average degree of polymerization of the polyvinyl alcohol contained in the PVA resin is not particularly limited, and is preferably 100 to 5,000, and more preferably 200 to 4,000. Production of the polyvinyl alcohol so as to have the viscosity-average degree of polymerization being less than 100 or more than 5,000 is difficult. The viscosity-average degree of polymerization is a value obtained by determination according to JIS-K6726 (1994). Specifically, in a case of a degree of saponification being less than 99.5 mol %, the viscosity-average degree of polymerization (P) is determined for the polyvinyl alcohol, having been saponified until the degree of saponification reached 99.5 mol % or more, by the following formula using a limiting viscosity [η] (L/g) determined in water at 30° C.

$$P=([\eta] \times 10^4/8.29)^{(1/0.62)}$$

The degree of saponification of the polyvinyl alcohol contained in the PVA resin is not particularly limited, and is preferably 70 to 99.9 mol %, and more preferably 78 to 95 mol %. In a case in which the degree of saponification is less than 70 mol %, solubility in water is likely to decrease; on the other hand, in a case in which the degree of saponification of the polyvinyl alcohol is more than 99.9 mol %, production is difficult. The degree of saponification is a value obtained by determination according to JIS-K6726 (1994).

The form of the PVA resin is not particularly limited, and a powdery form in which an average particle diameter is 50 to 2,000 μm is preferred. The average particle diameter of the PVA resin being in the powdery form is determined by a procedure disclosed in JIS-K6726 (1994).

EXAMPLES

Hereinafter, the present invention is described in detail by way of Examples. Unless otherwise specified particularly, in the following Examples and Comparative Examples, "parts" and "%" refer to parts by mass and % by mass, respectively.

Viscosity-Average Degree of Polymerization of Polyvinyl Alcohol

The viscosity-average degree of polymerization was determined according to JIS-K6726 (1994). Specifically, in a case of a degree of saponification being less than 99.5 mol %, the viscosity-average degree of polymerization (P) was determined for each PVA resin, having been saponified until the degree of saponification reached 99.5 mol % or more, by the following formula using a limiting viscosity [η] (L/g) determined in water at 30° C.

$$P=([\eta] \times 10^4/8.29)^{(1/0.62)}$$

Degree of Saponification of Polyvinyl Alcohol

The degree of saponification was determined according to JIS-K6726 (1994).

Content of Each of Methanol and Methyl Acetate in PVA Resin

Creation of Calibration Curves

With isopropanol as an internal standard, three types of aqueous solutions for which a content of methanol was known, and three types of aqueous solutions for which a content of methyl acetate was known were prepared, measurements were conducted using a gas chromatograph (GC-2010, available from Shimadzu Corporation) equipped with a headspace sampler (Turbo Matrix HS40, available from PerkinElmer Co., Ltd.), and calibration curves were created.

Determination of Content of Each of Methanol and Methyl Acetate

Distilled water was placed, so as to be even with a marked line, into a 1,000 mL volumetric flask, to which 0.1 mL of isopropanol, being the internal standard liquid, was added using a volumetric pipette, and a resulting liquid was stirred well. The resulting liquid was employed as a "solution." Next, 500 mg of the PVA resin was weighed in a vial for headspace gas-chromatography measurement, and following insertion of a stirring bar, 10 mL of the solution was measured into a transfer pipette and charged into the vial. A cap was affixed to the vial, and the cap was tightened until locking. Then the vial was placed on a hot stirrer, and the PVA resin was dissolved by heating. After visually confirming that the PVA resin had completely dissolved, the measurement by headspace gas chromatography was conducted, and the content of each of methanol and methyl acetate in the PVA resin was determined from the calibration curve created as described above.

Evaluation of Fusing State in PVA Resin

The fusing state in each PVA resin was observed visually, and evaluated according to the following criteria.

A. No change was seen in the resin.
B. Resin bonded by fusing was observed in a limited quantity.
C. A large quantity of resin was bonded by fusing.
D. The resin was combined by fusing.

Example 1

To a 30% polyvinyl acetate solution in methanol, a viscosity-average degree of polymerization of the polyvinyl acetate being 1,700, was added sodium hydroxide as a saponification catalyst at a molar ratio of 0.01 with respect to vinyl acetate units in the polyvinyl acetate at 40° C., and a saponification reaction was conducted for 1 hour. Following the saponification, a polyvinyl alcohol thus obtained (degree of saponification: 93 mol %) was roughly ground using a grinder to give a powder passed through a perforated plate with a diameter of 5 mm. The polyvinyl alcohol powder thus obtained was subjected to counter-current washing with a washing liquid containing 64.05 parts by mass of methyl acetate, 34.13 parts by mass of methanol, and 1.82 parts by mass of water, under conditions involving a temperature of 50° C., a time period of 1 hour, and a flow rate of 0.44 mm/s. In the washing step, the solid content concentration of the polyvinyl alcohol was 30% by mass.

Next, almost all of the solvent (the washing liquid) was eliminated by centrifugal separation and drying was conducted at 105° C. for 3 hrs to give a powdery PVA resin in which: the viscosity-average degree of polymerization of the polyvinyl alcohol was 1,700; the degree of saponification of the polyvinyl alcohol was 93 mol %; the content of methanol was 0.89% by mass; and the content of methyl acetate was 1.32% by mass. The results are shown in Table 1 below.

Examples 2 to 8 and Comparative Examples 1 to 4

Powdery PVA resins of Examples 2 to 8 and Comparative Examples 1 to 4 were obtained by a similar operation to that of Example 1, except that the degree of saponification of the polyvinyl alcohol subjected to the washing step and the composition of the washing liquid were changed as shown in Table 1. With regard to each of the PVA resins obtained, the viscosity-average degree of polymerization of the polyvinyl alcohol, the degree of saponification of the polyvinyl alcohol, and the content of each of methanol and methyl acetate are shown in Table 1.

TABLE 1

| | Polyvinyl alcohol[1] | | Washing step | | | PVA resin | | | | |
|---|---|---|---|---|---|---|---|---|---|---|
| | | | washing liquid | | | | | content | content | |
| | degree of poly-merization | degree of sapon-ification (mol %) | methyl acetate (parts by mass) | methanol (parts by mass) | water (parts by mass) | degree of poly-merization | degree of sapon-ification (mol %) | of methyl acetate (% by mass) | of methanol (% by mass) | fusing state (—) |
| Example 1 | 1700 | 93 | 64.05 | 34.13 | 1.82 | 1700 | 93 | 1.32 | 0.89 | A |
| Example 2 | 1700 | 92 | 63.85 | 34.03 | 2.13 | 1700 | 92 | 0.90 | 0.78 | A |
| Example 3 | 1700 | 92 | 63.99 | 34.10 | 1.91 | 1700 | 92 | 1.19 | 0.80 | A |
| Example 4 | 1700 | 92 | 64.16 | 34.20 | 1.64 | 1700 | 92 | 1.41 | 0.78 | A |
| Example 5 | 1700 | 92 | 64.22 | 34.22 | 1.56 | 1700 | 92 | 1.67 | 0.81 | A |
| Example 6 | 1700 | 93 | 64.18 | 34.21 | 1.61 | 1700 | 93 | 1.91 | 0.80 | A |
| Example 7 | 1700 | 93 | 75.12 | 21.60 | 3.28 | 1700 | 93 | 1.96 | 0.81 | A |
| Example 8 | 1700 | 93 | 58.89 | 36.74 | 4.37 | 1700 | 93 | 1.42 | 0.66 | B |
| Comparative Example 1 | 1700 | 95 | 64.89 | 34.58 | 0.53 | 1700 | 95 | 4.90 | 1.18 | A |
| Comparative Example 2 | 1700 | 93 | 64.61 | 34.43 | 0.96 | 1700 | 93 | 2.12 | 1.01 | A |
| Comparative Example 3 | 1700 | 93 | 45.09 | 42.31 | 12.60 | 1700 | 93 | 0.88 | 0.64 | D |
| Comparative Example 4 | 1700 | 93 | 34.77 | 59.13 | 6.10 | 1700 | 93 | 0.93 | 0.70 | C |

[1] Polyvinyl alcohol subjected to the washing step

In all of the Examples, almost no fusing of the PVA resins obtained was observed, indicating a favorable result. Moreover, in all of the Examples, in the PVA resins obtained, the content of methanol was less than 1.00% by mass, and the content of methyl acetate was less than 2.00% by mass. On the other hand, in each of Comparative Examples 1 and 2, the content of organic volatiles in the PVA resin obtained was high. Further, in each of Comparative Examples 3 and 4, fusing of the PVA resin obtained was observed.

INDUSTRIAL APPLICABILITY

According to the production method of the PVA resin of the one embodiment of the present invention, the PVA resin in which the content of the organic volatiles has been reduced can be easily obtained; thus, the PVA resin obtained is useful as a component material in foods, cosmetics, medical drugs, and the like, as well as a packaging material.

The invention claimed is:

1. A method for producing a polyvinyl alcohol resin, the method comprising:
   saponifying a polyvinyl ester, thereby producing a polyvinyl alcohol; and
   washing, with a washing liquid, the polyvinyl alcohol,
   wherein the washing liquid comprises, in parts by mass with respect to 100 parts by mass of a total of methyl acetate, methanol, and water, the methyl acetate in a range of from 50 to 98 parts, the methanol in a range of from 1 to 49 parts, and the water in a range of from 1 to 10 parts.
2. The method of claim 1, wherein the washing comprises counter-current washing at a temperature in a range of from 40 to 60° C. and a flow rate in a range of from 0.1 to 1 mm/s.
3. A polyvinyl alcohol resin, obtained by the method of claim 1, wherein a content of methanol is greater than or equal to 0.66% and less than 1.00% by mass, and a content of methyl acetate is less than 2.00% by mass.
4. The method of claim 1
   wherein a flow rate of the washing is in a range of from 0.1 to 0.44 mm/s.
5. The method of claim 1, further comprising:
   bulk polymerizing, in a bulk comprising a vinyl ester, the vinyl ester to produce the produce the polyvinyl ester.
6. The method of claim 1, further comprising:
   solution polymerizing, in a solution comprising a vinyl ester, the vinyl ester to produce the produce the polyvinyl ester.
7. The method of claim 1, further comprising:
   suspension polymerizing, in a suspension comprising a vinyl ester, the vinyl ester to produce the produce the polyvinyl ester.
8. The method of claim 1, further comprising:
   emulsion or dispersion polymerizing, in an emulsion or dispersion comprising a vinyl ester, the vinyl ester to produce the produce the polyvinyl ester.
9. The method of claim 1, further comprising:
   bulk polymerizing a vinyl ester to produce the produce the polyvinyl ester.
10. The method of claim 1, further comprising:
    solution polymerizing, in a solution comprising a vinyl ester and an alcohol, the vinyl ester to produce the produce the polyvinyl ester.
11. The method of claim 1, further comprising, directly after the washing:
    drying the polyvinyl alcohol.
12. The method of claim 1, wherein the polyvinyl ester further comprises, in polymerized form, a (meth)acrylic acid, a (meth)acrylate salt, a (meth)acrylate ester, and/or a (meth)acrylamide.
13. The method of claim 1, wherein the polyvinyl ester further comprises, in polymerized form, a vinyl ether and/or vinyl halide.
14. The method of claim 1, wherein the polyvinyl ester further comprises, in polymerized form, acrylonitrile, methacrylonitrile, and/or isopropenyl acetate.
15. The method of claim 1, wherein the polyvinyl ester further comprises, in polymerized form, an allyl compound, an unsaturated dicarboxylic acid, a vinyl silyl compound, and/or a vinylidene halide.
16. The method of claim 1, wherein the polyvinyl ester further comprises, in polymerized form, an α-olefin.
17. The method of claim 1, wherein the saponifying comprises a methoxide in a molar ratio with respect to vinyl ester units in the polyvinyl ester, in a range of from 0.001 to 0.5.
18. The method of claim 1, wherein the methyl acetate, the methanol, and the water make out a total of at least 90% by mass of the washing liquid, and
    wherein the washing liquid comprises, in parts by mass with respect to 100 parts by mass of the total of the methyl acetate, the methanol, and the water:
    the methyl acetate in a range of from 56 to 90 parts by mass;
    the methanol in a range of from 9 to 40 parts, and/or
    the water in a range of from 1 to 5 parts.
19. The method of claim 1, wherein the methyl acetate, the methanol, and the water make out a total of at least 99% by mass of the washing liquid, and
    wherein the washing liquid comprises, in parts by mass with respect to 100 parts by mass of the total of the methyl acetate, the methanol, and the water:
    the methyl acetate in a range of from 60 to 70 parts by mass;
    the methanol in a range of from 20 to 38, and
    the water in a range of from 1.5 to 3 parts.
20. The polyvinyl alcohol resin of claim 3, wherein the methyl acetate is present in an amount of greater than or equal to 1.19% and less than 2.00% by mass.

* * * * *